United States Patent [19]

Wickstrom

[11] Patent Number: 5,774,677
[45] Date of Patent: Jun. 30, 1998

[54] DUAL INTERLEAVED BLOCK MOTION COMPENSATION

[75] Inventor: Larry Wickstrom, Portland, Oreg.

[73] Assignee: Intel Corporation, Santa Clara, Calif.

[21] Appl. No.: 673,344

[22] Filed: Jun. 28, 1996

[51] Int. Cl.⁶ .................................................. H04N 7/12
[52] U.S. Cl. ..................... 395/200.77; 348/384; 348/420
[58] Field of Search ................. 395/200.77; 364/725.01, 364/725.02, 725.03; 348/384, 394, 402, 407, 416, 420

[56] References Cited

U.S. PATENT DOCUMENTS

| | | | |
|---|---|---|---|
| 5,189,526 | 2/1993 | Sasson | 358/432 |
| 5,414,780 | 5/1995 | Carnahan | 382/276 |
| 5,539,662 | 7/1996 | Nickerson | 364/514 R |
| 5,559,722 | 9/1996 | Nickerson | 364/514 R |
| 5,565,922 | 10/1996 | Krause | 348/413 |
| 5,598,514 | 1/1997 | Purcell et al. | 395/118 |
| 5,608,656 | 3/1997 | Purcell et al. | 364/514 R |
| 5,612,742 | 3/1997 | Krause et al. | 348/385 |

*Primary Examiner*—Hezron E. Williams
*Assistant Examiner*—Patrick Assouad
*Attorney, Agent, or Firm*—Duane, Morris & Heckscher LLP

[57] ABSTRACT

Input image data is stored in an interleaved format, in which data from two or more blocks are stored in an alternating fashion. Motion compensation is performed on the interleaved data by applying motion vectors to the appropriate data to generate different blocks of motion-compensated image data in the interleaved format. In one embodiment, the input image data are reference data and the motion compensation generates motion-compensated prediction data used during video compression processing. The present invention enables other steps in such video compression processing (e.g., inverse block transform and motion-compensated addition) to be implemented efficiently in pseudo-SIMD fashion without having to convert image data back and forth between the interleaved format and conventional block order format.

12 Claims, 20 Drawing Sheets

DECODE PROCESSING

FIG. 1. ENCODING SYSTEM

FIG. 2. DECODING SYSTEM

FIG. 3. ENCODE PROCESSING

FIG. 4. DECODE PROCESSING

FIG. 5

| C00 | C10 | C20 | C30 | C40 | C50 | C60 | C70 |
| --- | --- | --- | --- | --- | --- | --- | --- |
| C01 | C11 | C21 | C31 | C41 | C51 | C61 | C71 |
| C02 | C12 | C22 | C32 | C42 | C52 | C62 | C72 |
| C03 | C13 | C23 | C33 | C43 | C53 | C63 | C73 |
| C04 | C14 | C24 | C34 | C44 | C54 | C64 | C74 |
| C05 | C15 | C25 | C35 | C45 | C55 | C65 | C75 |
| C06 | C16 | C26 | C36 | C46 | C56 | C66 | C76 |
| C07 | C17 | C27 | C37 | C47 | C57 | C67 | C77 |

← 502

| D00 | D10 | D20 | D30 | D40 | D50 | D60 | D70 |
| --- | --- | --- | --- | --- | --- | --- | --- |
| D01 | D11 | D21 | D31 | D41 | D51 | D61 | D71 |
| D02 | D12 | D22 | D32 | D42 | D52 | D62 | D72 |
| D03 | D13 | D23 | D33 | D43 | D53 | D63 | D73 |
| D04 | D14 | D24 | D34 | D44 | D54 | D64 | D74 |
| D05 | D15 | D25 | D35 | D45 | D55 | D65 | D75 |
| D06 | D16 | D26 | D36 | D46 | D56 | D66 | D76 |
| D07 | D17 | D27 | D37 | D47 | D57 | D67 | D77 |

| MV$_x$ | MOTION-COMPENSATED PREDICTION DATA ||||||||
|---|---|---|---|---|---|---|---|
| | C0 | C1 | C2 | C3 | C4 | C5 | C6 | C7 |
| -16 | A0 | A1 | A2 | A3 | A4 | A5 | A6 | A7 |
| -15 | A1 | A2 | A3 | A4 | A5 | A6 | A7 | B0 |
| -14 | A2 | A3 | A4 | A5 | A6 | A7 | B0 | B1 |
| -13 | A3 | A4 | A5 | A6 | A7 | B0 | B1 | B2 |
| -12 | A4 | A5 | A6 | A7 | B0 | B1 | B2 | B3 |
| -11 | A5 | A6 | A7 | B0 | B1 | B2 | B3 | B4 |
| -10 | A6 | A7 | B0 | B1 | B2 | B3 | B4 | B5 |
| -9 | A7 | B0 | B1 | B2 | B3 | B4 | B5 | B6 |
| -8 | B0 | B1 | B2 | B3 | B4 | B5 | B6 | B7 |
| -7 | B1 | B2 | B3 | B4 | B5 | B6 | B7 | C0 |
| -6 | B2 | B3 | B4 | B5 | B6 | B7 | C0 | C1 |
| -5 | B3 | B4 | B5 | B6 | B7 | C0 | C1 | C2 |
| -4 | B4 | B5 | B6 | B7 | C0 | C1 | C2 | C3 |
| -3 | B5 | B6 | B7 | C0 | C1 | C2 | C3 | C4 |
| -2 | B6 | B7 | C0 | C1 | C2 | C3 | C4 | C5 |
| -1 | B7 | C0 | C1 | C2 | C3 | C4 | C5 | C6 |
| 0 | C0 | C1 | C2 | C3 | C4 | C5 | C6 | C7 |
| +1 | C1 | C2 | C3 | C4 | C5 | C6 | C7 | D0 |
| +2 | C2 | C3 | C4 | C5 | C6 | C7 | D0 | D1 |
| +3 | C3 | C4 | C5 | C6 | C7 | D0 | D1 | D2 |
| +4 | C4 | C5 | C6 | C7 | D0 | D1 | D2 | D3 |
| +5 | C5 | C6 | C7 | D0 | D1 | D2 | D3 | D4 |
| +6 | C6 | C7 | D0 | D1 | D2 | D3 | D4 | D5 |
| +7 | C7 | D0 | D1 | D2 | D3 | D4 | D5 | D6 |
| +8 | D0 | D1 | D2 | D3 | D4 | D5 | D6 | D7 |
| +9 | D1 | D2 | D3 | D4 | D5 | D6 | D7 | E0 |
| +10 | D2 | D3 | D4 | D5 | D6 | D7 | E0 | E1 |
| +11 | D3 | D4 | D5 | D6 | D7 | E0 | E1 | E2 |
| +12 | D4 | D5 | D6 | D7 | E0 | E1 | E2 | E3 |
| +13 | D5 | D6 | D7 | E0 | E1 | E2 | E3 | E4 |
| +14 | D6 | D7 | E0 | E1 | E2 | E3 | E4 | E5 |
| +15 | D7 | E0 | E1 | E2 | E3 | E4 | E5 | E6 |
| +16 | E0 | E1 | E2 | E3 | E4 | E5 | E6 | E7 |

FIG. 8

| MV$_x$ | MOTION-COMPENSATED PREDICTION DATA | | | | | | |
|---|---|---|---|---|---|---|---|
| | D0 | D1 | D2 | D3 | D4 | D5 | D6 | D7 |
| -16 | B0 | B1 | B2 | B3 | B4 | B5 | B6 | B7 |
| -15 | B1 | B2 | B3 | B4 | B5 | B6 | B7 | C0 |
| -14 | B2 | B3 | B4 | B5 | B6 | B7 | C0 | C1 |
| -13 | B3 | B4 | B5 | B6 | B7 | C0 | C1 | C2 |
| -12 | B4 | B5 | B6 | B7 | C0 | C1 | C2 | C3 |
| -11 | B5 | B6 | B7 | C0 | C1 | C2 | C3 | C4 |
| -10 | B6 | B7 | C0 | C1 | C2 | C3 | C4 | C5 |
| -9 | B7 | C0 | C1 | C2 | C3 | C4 | C5 | C6 |
| -8 | C0 | C1 | C2 | C3 | C4 | C5 | C6 | C7 |
| -7 | C1 | C2 | C3 | C4 | C5 | C6 | C7 | D0 |
| -6 | C2 | C3 | C4 | C5 | C6 | C7 | D0 | D1 |
| -5 | C3 | C4 | C5 | C6 | C7 | D0 | D1 | D2 |
| -4 | C4 | C5 | C6 | C7 | D0 | D1 | D2 | D3 |
| -3 | C5 | C6 | C7 | D0 | D1 | D2 | D3 | D4 |
| -2 | C6 | C7 | D0 | D1 | D2 | D3 | D4 | D5 |
| -1 | C7 | D0 | D1 | D2 | D3 | D4 | D5 | D6 |
| 0 | D0 | D1 | D2 | D3 | D4 | D5 | D6 | D7 |
| +1 | D1 | D2 | D3 | D4 | D5 | D6 | D7 | E0 |
| +2 | D2 | D3 | D4 | D5 | D6 | D7 | E0 | E1 |
| +3 | D3 | D4 | D5 | D6 | D7 | E0 | E1 | E2 |
| +4 | D4 | D5 | D6 | D7 | E0 | E1 | E2 | E3 |
| +5 | D5 | D6 | D7 | E0 | E1 | E2 | E3 | E4 |
| +6 | D6 | D7 | E0 | E1 | E2 | E3 | E4 | E5 |
| +7 | D7 | E0 | E1 | E2 | E3 | E4 | E5 | E6 |
| +8 | E0 | E1 | E2 | E3 | E4 | E5 | E6 | E7 |
| +9 | E1 | E2 | E3 | E4 | E5 | E6 | E7 | F0 |
| +10 | E2 | E3 | E4 | E5 | E6 | E7 | F0 | F1 |
| +11 | E3 | E4 | E5 | E6 | E7 | F0 | F1 | F2 |
| +12 | E4 | E5 | E6 | E7 | F0 | F1 | F2 | F3 |
| +13 | E5 | E6 | E7 | F0 | F1 | F2 | F3 | F4 |
| +14 | E6 | E7 | F0 | F1 | F2 | F3 | F4 | F5 |
| +15 | E7 | F0 | F1 | F2 | F3 | F4 | F5 | F6 |
| +16 | F0 | F1 | F2 | F3 | F4 | F5 | F6 | F7 |

FIG. 9

| | DATA OFFSETS FOR BLOCK ORDER FORMAT | | | | | | | |
|---|---|---|---|---|---|---|---|---|
| $MV_X$ | C0 | C1 | C2 | C3 | C4 | C5 | C6 | C7 |
| -16 | -16 | -16 | -16 | -16 | -16 | -16 | -16 | -16 |
| -15 | -15 | -15 | -15 | -15 | -15 | -15 | -15 | -15 |
| -14 | -14 | -14 | -14 | -14 | -14 | -14 | -14 | -14 |
| -13 | -13 | -13 | -13 | -13 | -13 | -13 | -13 | -13 |
| -12 | -12 | -12 | -12 | -12 | -12 | -12 | -12 | -12 |
| -11 | -11 | -11 | -11 | -11 | -11 | -11 | -11 | -11 |
| -10 | -10 | -10 | -10 | -10 | -10 | -10 | -10 | -10 |
| -9 | -9 | -9 | -9 | -9 | -9 | -9 | -9 | -9 |
| -8 | -8 | -8 | -8 | -8 | -8 | -8 | -8 | -8 |
| -7 | -7 | -7 | -7 | -7 | -7 | -7 | -7 | -7 |
| -6 | -6 | -6 | -6 | -6 | -6 | -6 | -6 | -6 |
| -5 | -5 | -5 | -5 | -5 | -5 | -5 | -5 | -5 |
| -4 | -4 | -4 | -4 | -4 | -4 | -4 | -4 | -4 |
| -3 | -3 | -3 | -3 | -3 | -3 | -3 | -3 | -3 |
| -2 | -2 | -2 | -2 | -2 | -2 | -2 | -2 | -2 |
| -1 | -1 | -1 | -1 | -1 | -1 | -1 | -1 | -1 |
| 0 | 0 | 0 | 0 | 0 | 0 | 0 | 0 | 0 |
| +1 | +1 | +1 | +1 | +1 | +1 | +1 | +1 | +1 |
| +2 | +2 | +2 | +2 | +2 | +2 | +2 | +2 | +2 |
| +3 | +3 | +3 | +3 | +3 | +3 | +3 | +3 | +3 |
| +4 | +4 | +4 | +4 | +4 | +4 | +4 | +4 | +4 |
| +5 | +5 | +5 | +5 | +5 | +5 | +5 | +5 | +5 |
| +6 | +6 | +6 | +6 | +6 | +6 | +6 | +6 | +6 |
| +7 | +7 | +7 | +7 | +7 | +7 | +7 | +7 | +7 |
| +8 | +8 | +8 | +8 | +8 | +8 | +8 | +8 | +8 |
| +9 | +9 | +9 | +9 | +9 | +9 | +9 | +9 | +9 |
| +10 | +10 | +10 | +10 | +10 | +10 | +10 | +10 | +10 |
| +11 | +11 | +11 | +11 | +11 | +11 | +11 | +11 | +11 |
| +12 | +12 | +12 | +12 | +12 | +12 | +12 | +12 | +12 |
| +13 | +13 | +13 | +13 | +13 | +13 | +13 | +13 | +13 |
| +14 | +14 | +14 | +14 | +14 | +14 | +14 | +14 | +14 |
| +15 | +15 | +15 | +15 | +15 | +15 | +15 | +15 | +15 |
| +16 | +16 | +16 | +16 | +16 | +16 | +16 | +16 | +16 |

| $MV_x$ | DATA OFFSETS FOR LEFT BLOCK ||||||||
|---|---|---|---|---|---|---|---|---|
| | C0 | C1 | C2 | C3 | C4 | C5 | C6 | C7 |
| -16 | -16 | -16 | -16 | -16 | -16 | -16 | -16 | -16 |
| -15 | -14 | -14 | -14 | -14 | -14 | -14 | -14 | -29 |
| -14 | -12 | -12 | -12 | -12 | -12 | -12 | -27 | -27 |
| -13 | -10 | -10 | -10 | -10 | -10 | -25 | -25 | -25 |
| -12 | -8 | -8 | -8 | -8 | -23 | -23 | -23 | -23 |
| -11 | -6 | -6 | -6 | -21 | -21 | -21 | -21 | -21 |
| -10 | -4 | -4 | -19 | -19 | -19 | -19 | -19 | -19 |
| -9 | -2 | -17 | -17 | -17 | -17 | -17 | -17 | -17 |
| -8 | -15 | -15 | -15 | -15 | -15 | -15 | -15 | -15 |
| -7 | -13 | -13 | -13 | -13 | -13 | -13 | -13 | -14 |
| -6 | -11 | -11 | -11 | -11 | -11 | -11 | -12 | -12 |
| -5 | -9 | -9 | -9 | -9 | -9 | -10 | -10 | -10 |
| -4 | -7 | -7 | -7 | -7 | -8 | -8 | -8 | -8 |
| -3 | -5 | -5 | -5 | -6 | -6 | -6 | -6 | -6 |
| -2 | -3 | -3 | -4 | -4 | -4 | -4 | -4 | -4 |
| -1 | -1 | -2 | -2 | -2 | -2 | -2 | -2 | -2 |
| 0 | 0 | 0 | 0 | 0 | 0 | 0 | 0 | 0 |
| +1 | +2 | +2 | +2 | +2 | +2 | +2 | +2 | -13 |
| +2 | +4 | +4 | +4 | +4 | +4 | +4 | -11 | -11 |
| +3 | +6 | +6 | +6 | +6 | +6 | -9 | -9 | -9 |
| +4 | +8 | +8 | +8 | +8 | -7 | -7 | -7 | -7 |
| +5 | +10 | +10 | +10 | -5 | -5 | -5 | -5 | -5 |
| +6 | +12 | +12 | -3 | -3 | -3 | -3 | -3 | -3 |
| +7 | +14 | -1 | -1 | -1 | -1 | -1 | -1 | -1 |
| +8 | +1 | +1 | +1 | +1 | +1 | +1 | +1 | +1 |
| +9 | +3 | +3 | +3 | +3 | +3 | +3 | +3 | +2 |
| +10 | +5 | +5 | +5 | +5 | +5 | +5 | +4 | +4 |
| +11 | +7 | +7 | +7 | +7 | +7 | +6 | +6 | +6 |
| +12 | +9 | +9 | +9 | +9 | +8 | +8 | +8 | +8 |
| +13 | +11 | +11 | +11 | +10 | +10 | +10 | +10 | +10 |
| +14 | +13 | +13 | +12 | +12 | +12 | +12 | +12 | +12 |
| +15 | +15 | +14 | +14 | +14 | +14 | +14 | +14 | +14 |
| +16 | +16 | +16 | +16 | +16 | +16 | +16 | +16 | +16 |

FIG. 13

| MV$_x$ | DATA OFFSETS FOR RIGHT BLOCK | | | | | | | |
|---|---|---|---|---|---|---|---|---|
| | D0 | D1 | D2 | D3 | D4 | D5 | D6 | D7 |
| −16 | −16 | −16 | −16 | −16 | −16 | −16 | −16 | −16 |
| −15 | −14 | −14 | −14 | −14 | −14 | −14 | −14 | −15 |
| −14 | −12 | −12 | −12 | −12 | −12 | −12 | −13 | −13 |
| −13 | −10 | −10 | −10 | −10 | −10 | −11 | −11 | −11 |
| −12 | −8 | −8 | −8 | −8 | −9 | −9 | −9 | −9 |
| −11 | −6 | −6 | −6 | −7 | −7 | −7 | −7 | −7 |
| −10 | −4 | −4 | −5 | −5 | −5 | −5 | −5 | −5 |
| −9 | −2 | −3 | −3 | −3 | −3 | −3 | −3 | −3 |
| −8 | −1 | −1 | −1 | −1 | −1 | −1 | −1 | −1 |
| −7 | +1 | +1 | +1 | +1 | +1 | +1 | +1 | −14 |
| −6 | +3 | +3 | +3 | +3 | +3 | +3 | −12 | −12 |
| −5 | +5 | +5 | +5 | +5 | +5 | −10 | −10 | −10 |
| −4 | +7 | +7 | +7 | +7 | −8 | −8 | −8 | −8 |
| −3 | +9 | +9 | +9 | −6 | −6 | −6 | −6 | −6 |
| −2 | +11 | +11 | −4 | −4 | −4 | −4 | −4 | −4 |
| −1 | +13 | −2 | −2 | −2 | −2 | −2 | −2 | −2 |
| 0 | 0 | 0 | 0 | 0 | 0 | 0 | 0 | 0 |
| +1 | +2 | +2 | +2 | +2 | +2 | +2 | +2 | +1 |
| +2 | +4 | +4 | +4 | +4 | +4 | +4 | +3 | +3 |
| +3 | +6 | +6 | +6 | +6 | +6 | +5 | +5 | +5 |
| +4 | +8 | +8 | +8 | +8 | +7 | +7 | +7 | +7 |
| +5 | +10 | +10 | +10 | +9 | +9 | +9 | +9 | +9 |
| +6 | +12 | +12 | +11 | +11 | +11 | +11 | +11 | +11 |
| +7 | +14 | +13 | +13 | +13 | +13 | +13 | +13 | +13 |
| +8 | +15 | +15 | +15 | +15 | +15 | +15 | +15 | +15 |
| +9 | +17 | +17 | +17 | +17 | +17 | +17 | +17 | +2 |
| +10 | +19 | +19 | +19 | +19 | +19 | +19 | +4 | +4 |
| +11 | +21 | +21 | +21 | +21 | +21 | +6 | +6 | +6 |
| +12 | +23 | +23 | +23 | +23 | +8 | +8 | +8 | +8 |
| +13 | +25 | +25 | +25 | +10 | +10 | +10 | +10 | +10 |
| +14 | +27 | +27 | +12 | +12 | +12 | +12 | +12 | +12 |
| +15 | +29 | +14 | +14 | +14 | +14 | +14 | +14 | +14 |
| +16 | +16 | +16 | +16 | +16 | +16 | +16 | +16 | +16 |

FIG. 15

| Table Index | Low Block | | High Block | |
|---|---|---|---|---|
| | Source (SRC) | Destination (DST) | Source (SRC) | Destination (DST) |
| 0 | 0 | 0 | 1 | 1 |
| 1 | 2 | 2 | 3 | 3 |
| 2 | 4 | 4 | 5 | 5 |
| 3 | 6 | 6 | 7 | 7 |
| 4 | 8 | 8 | 9 | 9 |
| 5 | 10 | 10 | 11 | 11 |
| 6 | 12 | 12 | 13 | 13 |
| 7 | 14 | 14 | 15 | 15 |
| 8 | 1 | 16 | 16 | 17 |
| 9 | 3 | 18 | 18 | 19 |
| 10 | 5 | 20 | 20 | 21 |
| 11 | 7 | 22 | 22 | 23 |
| 12 | 9 | 24 | 24 | 25 |
| 13 | 11 | 26 | 26 | 27 |
| 14 | 13 | 28 | 28 | 29 |
| 15 | 15 | 30 | 30 | 31 |
| 16 | 16 | 32 | 17 | 33 |
| 17 | 18 | 34 | 19 | 35 |
| 18 | 20 | 36 | 21 | 37 |
| 19 | 22 | 38 | 23 | 39 |
| 20 | 24 | 40 | 25 | 41 |
| 21 | 26 | 42 | 27 | 43 |
| 22 | 28 | 44 | 29 | 45 |

FIG. 16A

```
1    /* DEFINE ENTRY TABLE FOR MEMORY LOCATIONS OF CODE */
2    MCENTRY_TABLE[2][16] = {
3        { LABEL_LO_0,  LABEL_LO_1,  ..., LABEL_LO_14, LABEL_LO_15 },
4        { LABEL_HI_0,  LABEL_HI_1,  ..., LABEL_HI_14, LABEL_HI_15 },
5    }
6
7    FOR EACH BLOCK IN FRAME {
8
9        /* SET TABLE INDEX FOR CURRENT BLOCK IN DIB FORMAT */
10       HI_LO = 0 IF BLOCK IS LO, ELSE 1
11
12       /* SET INITIAL SOURCE POINTER TO FIRST ENTRY IN REFERENCE DIB */
13       SRC0 = POINTER_TO_CURRENT_DIB_IN_REFERENCE_FRAME
14
15       /* SET INITIAL DESTINATION POINTER TO FIRST ELEMENT IN CURRENT DIB */
16       DST0 = POINTER_TO_CURRENT_DIB_IN_CURRENT_FRAME
17
18       /* SELECT CURRENT SOURCE ROW */
19       SRC = SRC0 + Y*PITCH
20
21       /* SELECT CORRECT DIB */
22       SRC = SRC + (X AND (BINARY_NOT (16-1)))
23
24       /* CANCEL OUT FIXED CODE OFFSETS */
25       DST = DST0 - 2*(X AND (16-1))
26
27       /* GET JUMP LOCATION FOR CODE */
28       MCENTRY = MCENTRY_TABLE[HI_LO][X AND (16-1)]
29
30       /* PRE-DECREMENT SRC AND DST BY PITCH */
31       SRC = SRC - PITCH
32       DST = DST - PITCH
33
34       /* INITIALIZE Y COUNTER FOR CURRENT BLOCK */
35       YCOUNT = BLOCKSIZE
36
37       /* MAIN LOOP FOR CURRENT BLOCK */
38       MOTION1LOOP:
39          DECREMENT YCOUNT
40
41          /* IS CURRENT BLOCK DONE? */
42          IF YCOUNT IS NEGATIVE GOTO MOTION1DONE
43
44          /* INITIALIZE X COUNTER FOR CURRENT BLOCK */
45          XCOUNT = BLOCKSIZE
46
47          /* INCREMENT SRC AND DST BY PITCH FOR NEXT ROW */
48          SRC += PITCH
49          DST += PITCH
50
51          /* JUMP TO COPY CODE */
52          GOTO MCENTRY
53
54       MOTION1DONE:
55   }
```

FIG. 16B

```
1       LABEL_LO_0:
2          MEMORY[DST + 0] = MEMORY[SRC + 0]
3          DECREMENT XCOUNT
4          IF XCOUNT ≤ 0 GOTO MOTION1LOOP
5
6       LABEL_LO_1:
7          MEMORY[DST + 2] = MEMORY[SRC + 2]
8          DECREMENT XCOUNT
9          IF XCOUNT ≤ 0 GOTO MOTION1LOOP
10
11      LABEL_LO_2:
12         MEMORY[DST + 4] = MEMORY[SRC + 4]
13         DECREMENT XCOUNT
14         IF XCOUNT ≤ 0 GOTO MOTION1LOOP
15
16      LABEL_LO_3:
17         MEMORY[DST + 6] = MEMORY[SRC + 6]
18         DECREMENT XCOUNT
19         IF XCOUNT ≤ 0 GOTO MOTION1LOOP
20
21      LABEL_LO_4:
22         MEMORY[DST + 8] = MEMORY[SRC + 8]
23         DECREMENT XCOUNT
24         IF XCOUNT ≤ 0 GOTO MOTION1LOOP
25
26      LABEL_LO_5:
27         MEMORY[DST + 10] = MEMORY[SRC + 10]
28         DECREMENT XCOUNT
29         IF XCOUNT ≤ 0 GOTO MOTION1LOOP
30
31      LABEL_LO_6:
32         MEMORY[DST + 12] = MEMORY[SRC + 12]
33         DECREMENT XCOUNT
34         IF XCOUNT ≤ 0 GOTO MOTION1LOOP
35
36      LABEL_LO_7:
37         MEMORY[DST + 14] = MEMORY[SRC + 14]
38         DECREMENT XCOUNT
39         IF XCOUNT ≤ 0 GOTO MOTION1LOOP
40
41      LABEL_LO_8:
42         MEMORY[DST + 16] = MEMORY[SRC + 1]
43         DECREMENT XCOUNT
44         IF XCOUNT ≤ 0 GOTO MOTION1LOOP
45
46      LABEL_LO_9:
47         MEMORY[DST + 18] = MEMORY[SRC + 3]
48         DECREMENT XCOUNT
49         IF XCOUNT ≤ 0 GOTO MOTION1LOOP
50
51      LABEL_LO_10:
52         MEMORY[DST + 20] = MEMORY[SRC + 5]
53         DECREMENT XCOUNT
54         IF XCOUNT ≤ 0 GOTO MOTION1LOOP
55
56      LABEL_LO_11:
57         MEMORY[DST + 22] = MEMORY[SRC + 7]
58         DECREMENT XCOUNT
59         IF XCOUNT ≤ 0 GOTO MOTION1LOOP
```

FIG. 16C

```
1     LABEL_LO_12:
2        MEMORY[DST + 24] = MEMORY[SRC + 9]
3        DECREMENT XCOUNT
4        IF XCOUNT ≤ 0 GOTO MOTION1LOOP
5
6     LABEL_LO_13:
7        MEMORY[DST + 26] = MEMORY[SRC + 11]
8        DECREMENT XCOUNT
9        IF XCOUNT ≤ 0 GOTO MOTION1LOOP
10
11    LABEL_LO_14:
12       MEMORY[DST + 28] = MEMORY[SRC + 13]
13       DECREMENT XCOUNT
14       IF XCOUNT ≤ 0 GOTO MOTION1LOOP
15
16    LABEL_LO_15:
17       MEMORY[DST + 30] = MEMORY[SRC + 15]
18       DECREMENT XCOUNT
19       IF XCOUNT ≤ 0 GOTO MOTION1LOOP
20
21    LABEL_LO_16:
22       MEMORY[DST + 32] = MEMORY[SRC + 16]
23       DECREMENT XCOUNT
24       IF XCOUNT ≤ 0 GOTO MOTION1LOOP
25
26    LABEL_LO_17:
27       MEMORY[DST + 34] = MEMORY[SRC + 18]
28       DECREMENT XCOUNT
29       IF XCOUNT ≤ 0 GOTO MOTION1LOOP
30
31    LABEL_LO_18:
32       MEMORY[DST + 36] = MEMORY[SRC + 20]
33       DECREMENT XCOUNT
34       IF XCOUNT ≤ 0 GOTO MOTION1LOOP
35
36    LABEL_LO_19:
37       MEMORY[DST + 38] = MEMORY[SRC + 22]
38       DECREMENT XCOUNT
39       IF XCOUNT ≤ 0 GOTO MOTION1LOOP
40
41    LABEL_LO_20:
42       MEMORY[DST + 40] = MEMORY[SRC + 24]
43       DECREMENT XCOUNT
44       IF XCOUNT ≤ 0 GOTO MOTION1LOOP
45
46    LABEL_LO_21:
47       MEMORY[DST + 42] = MEMORY[SRC + 26]
48       DECREMENT XCOUNT
49       IF XCOUNT ≤ 0 GOTO MOTION1LOOP
50
51    LABEL_LO_22:
52       MEMORY[DST + 44] = MEMORY[SRC + 28]
53       DECREMENT XCOUNT
54       IF XCOUNT ≤ 0 GOTO MOTION1LOOP
```

FIG. 16D

```
1    LABEL_HI_0:
2       MEMORY[DST + 1] = MEMORY[SRC + 1]
3       DECREMENT XCOUNT
4       IF XCOUNT ≤ 0 GOTO MOTION1LOOP
5
6    LABEL_HI_1:
7       MEMORY[DST + 3] = MEMORY[SRC + 3]
8       DECREMENT XCOUNT
9       IF XCOUNT ≤ 0 GOTO MOTION1LOOP
10
11   LABEL_HI_2:
12      MEMORY[DST + 5] = MEMORY[SRC + 5]
13      DECREMENT XCOUNT
14      IF XCOUNT ≤ 0 GOTO MOTION1LOOP
15
16   LABEL_HI_3:
17      MEMORY[DST + 7] = MEMORY[SRC + 7]
18      DECREMENT XCOUNT
19      IF XCOUNT ≤ 0 GOTO MOTION1LOOP
20
21   LABEL_HI_4:
22      MEMORY[DST + 9] = MEMORY[SRC + 9]
23      DECREMENT XCOUNT
24      IF XCOUNT ≤ 0 GOTO MOTION1LOOP
25
26   LABEL_HI_5:
27      MEMORY[DST + 11] = MEMORY[SRC + 11]
28      DECREMENT XCOUNT
29      IF XCOUNT ≤ 0 GOTO MOTION1LOOP
30
31   LABEL_HI_6:
32      MEMORY[DST + 13] = MEMORY[SRC + 13]
33      DECREMENT XCOUNT
34      IF XCOUNT ≤ 0 GOTO MOTION1LOOP
35
36   LABEL_HI_7:
37      MEMORY[DST + 15] = MEMORY[SRC + 15]
38      DECREMENT XCOUNT
39      IF XCOUNT ≤ 0 GOTO MOTION1LOOP
40
41   LABEL_HI_8:
42      MEMORY[DST + 17] = MEMORY[SRC + 16]
43      DECREMENT XCOUNT
44      IF XCOUNT ≤ 0 GOTO MOTION1LOOP
45
46   LABEL_HI_9:
47      MEMORY[DST + 19] = MEMORY[SRC + 18]
48      DECREMENT XCOUNT
49      IF XCOUNT ≤ 0 GOTO MOTION1LOOP
50
51   LABEL_HI_10:
52      MEMORY[DST + 21] = MEMORY[SRC + 20]
53      DECREMENT XCOUNT
54      IF XCOUNT ≤ 0 GOTO MOTION1LOOP
55
56   LABEL_HI_11:
57      MEMORY[DST + 23] = MEMORY[SRC + 22]
58      DECREMENT XCOUNT
59      IF XCOUNT ≤ 0 GOTO MOTION1LOOP
```

FIG. 16E

```
1    LABEL_HI_12:
2        MEMORY[DST + 25] = MEMORY[SRC + 24]
3        DECREMENT XCOUNT
4        IF XCOUNT ≤ 0 GOTO MOTION1LOOP
5
6    LABEL_HI_13:
7        MEMORY[DST + 27] = MEMORY[SRC + 26]
8        DECREMENT XCOUNT
9        IF XCOUNT ≤ 0 GOTO MOTION1LOOP
10
11   LABEL_HI_14:
12       MEMORY[DST + 29] = MEMORY[SRC + 28]
13       DECREMENT XCOUNT
14       IF XCOUNT ≤ 0 GOTO MOTION1LOOP
15
16   LABEL_HI_15:
17       MEMORY[DST + 31] = MEMORY[SRC + 30]
18       DECREMENT XCOUNT
19       IF XCOUNT ≤ 0 GOTO MOTION1LOOP
20
21   LABEL_HI_16:
22       MEMORY[DST + 33] = MEMORY[SRC + 17]
23       DECREMENT XCOUNT
24       IF XCOUNT ≤ 0 GOTO MOTION1LOOP
25
26   LABEL_HI_17:
27       MEMORY[DST + 35] = MEMORY[SRC + 19]
28       DECREMENT XCOUNT
29       IF XCOUNT ≤ 0 GOTO MOTION1LOOP
30
31   LABEL_HI_18:
32       MEMORY[DST + 37] = MEMORY[SRC + 21]
33       DECREMENT XCOUNT
34       IF XCOUNT ≤ 0 GOTO MOTION1LOOP
35
36   LABEL_HI_19:
37       MEMORY[DST + 39] = MEMORY[SRC + 23]
38       DECREMENT XCOUNT
39       IF XCOUNT ≤ 0 GOTO MOTION1LOOP
40
41   LABEL_HI_20:
42       MEMORY[DST + 41] = MEMORY[SRC + 25]
43       DECREMENT XCOUNT
44       IF XCOUNT ≤ 0 GOTO MOTION1LOOP
45
46   LABEL_HI_21:
47       MEMORY[DST + 43] = MEMORY[SRC + 27]
48       DECREMENT XCOUNT
49       IF XCOUNT ≤ 0 GOTO MOTION1LOOP
50
51   LABEL_HI_22:
52       MEMORY[DST + 45] = MEMORY[SRC + 29]
53       DECREMENT XCOUNT
54       IF XCOUNT ≤ 0 GOTO MOTION1LOOP
```

5,774,677

DUAL INTERLEAVED BLOCK MOTION COMPENSATION

CROSS-REFERENCES TO RELATED APPLICATIONS

This application is related to U.S. patent application Ser. No. 08/234,976, filed Apr. 28, 1994 as attorney docket no. 366403-994 ("the '994 application"), now U.S. Pat. No. 5,559,722, the teachings of which are incorporated herein by reference.

BACKGROUND OF THE INVENTION

1. Field of the Invention

The present invention relates to image processing, and, in particular, to decoding encoded video data using motion compensation.

2. Description of the Related Art

Motion compensation is often used in video compression algorithms to take advantage of the temporal redundancy that exists between frames in a video sequence. According to conventional motion compensation schemes, a video frame is divided into blocks of pixels and each block is compared to a reference frame to identify a region of the reference frame that closely matches the block of the current frame. The displacement between the locations of the two blocks is specified by a motion vector that is encoded into the encoded video bitstream. The pixel-to-pixel differences between the two blocks are also encoded into the bitstream. A decoder will reconstruct the reference frame (typically using data from one or more other video frames of the original video sequence). The decoder will decode the motion vectors from the bitstream and use those motion vectors to reconstruct a motion-compensated prediction for the current frame. The decoder will also decode the pixel-to-pixel differences (also called interframe differences) and use that data to correct the motion-compensated prediction. The result is a decoded frame corresponding to the frame of the original input stream.

The present invention is related to an improved scheme for performing motion compensation that may be used in video compression/decompression algorithms.

Further objects and advantages of this invention will become apparent from the detailed description which follows.

SUMMARY OF THE INVENTION

The present invention is directed to the processing of image data. According to one embodiment, input image data is stored in an interleaved format. A first motion vector is applied to the input image data in the interleaved format to generate a first block of motion-compensated image data, and a second motion vector is applied to the input image data in the interleaved format to generate a second block of motion-compensated image data, wherein the first and second blocks are interleaved together in the interleaved format.

BRIEF DESCRIPTION OF THE DRAWINGS

Other objects, features, and advantages of the present invention will become more fully apparent from the following detailed description, the appended claims, and the accompanying drawings in which:

FIG. 5 is a representation of the decoded band data for two adjacent (8×8) blocks stored in conventional block order;

FIGS. 7 and 8 are tabulation of the motion-compensated prediction data for different X displacements from +8 to −8 based on the reference data of FIG. 6;

FIG. 9 is a tabulation of the data offsets for each of the X coordinates from +8 to −8 between the reference data of FIG. 6 and the motion-compensated prediction data of FIGS. 7 and 8;

FIGS. 12 and 13 are tabulations of the data offsets for the reference data for the blocks of FIG. 5, when the reference data is stored in the DIB format of FIG. 10;

FIG. 15 is a tabulation of 23 different sets of offsets that correspond to the patterns exhibited by the data offsets in FIGS. 12 and 13;

FIGS. 16A–E is pseudocode for performing motion compensation to generate each block of a current prediction frame, according to one embodiment of the present invention.

DETAILED DESCRIPTION

The present invention is directed to a motion compensation scheme that applies motion vectors to image data stored in an interleaved format to generate motion-compensated image data also stored in the interleaved format. The present invention enables other steps in video compression processing to be implemented efficiently using pseudo-SIMD (single-instruction, multiple-data) techniques without having to convert image data back and forth between the interleaved format and conventional block order format.

System Hardware Architectures

Figure 1:
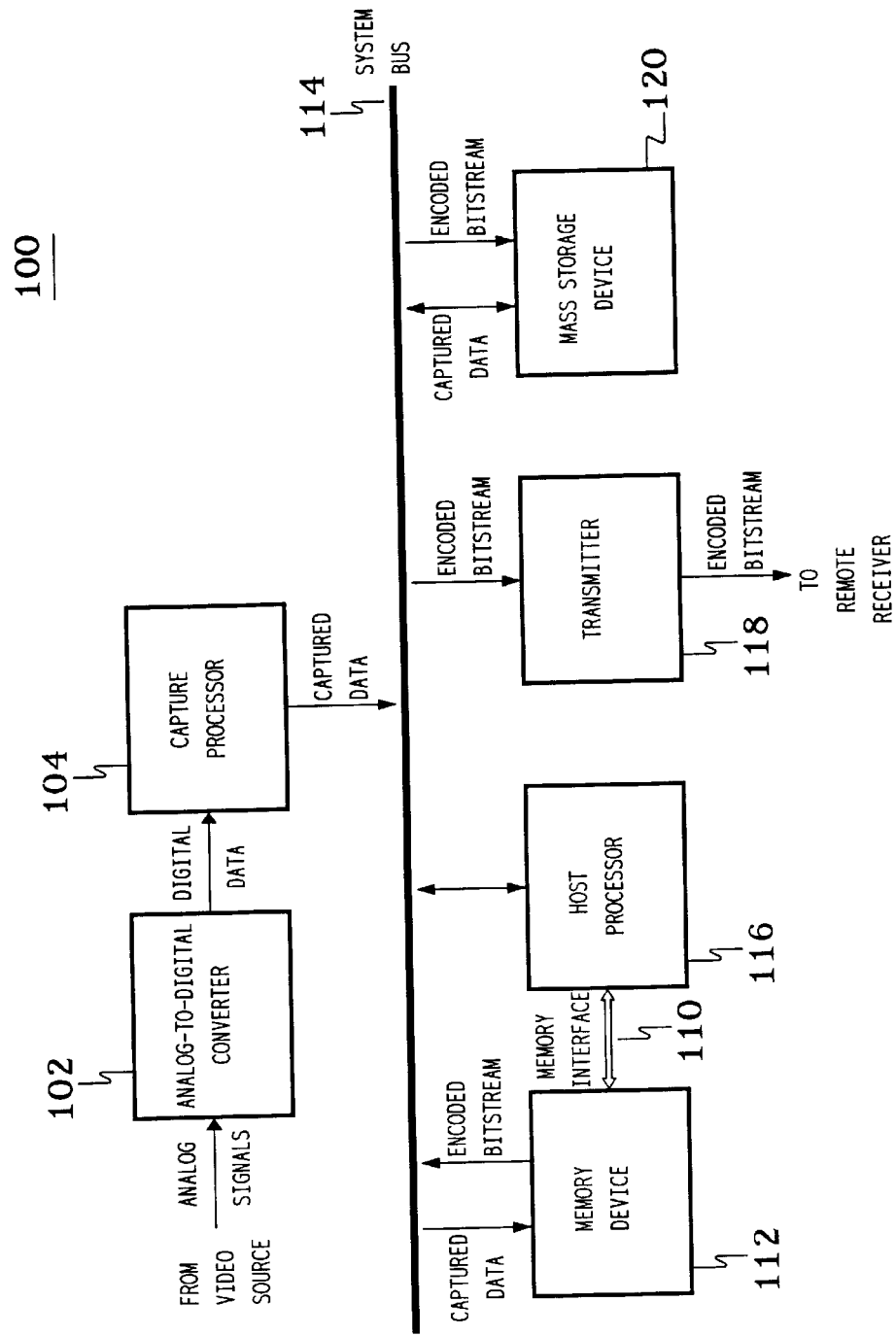
FIG. 1 is a block diagram of a computer system for encoding video signals, according to one embodiment of the present invention.

Referring now to FIG. 1, there is shown a block diagram of computer system 100 for encoding video signals, according to one embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data).

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a YUV9 (i.e., YUV 4:1:0) format, in which every (4×4) block of pixels of the Y-component plane corresponds to a single pixel in the U-component plane and a single pixel in the V-component plane. Capture processor 104 selectively stores the captured data to memory device 112 and/or mass storage device 120 via system bus 114. Those skilled in the art will understand that, for real-time encoding, the captured data may be stored to memory device 112, while for non-real-time encoding, the captured data may be stored to mass storage device 120. For non-real-time encoding, the captured data will subsequently be retrieved from mass storage device 120 and stored in memory device 112 for encode processing by host processor 116.

During encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
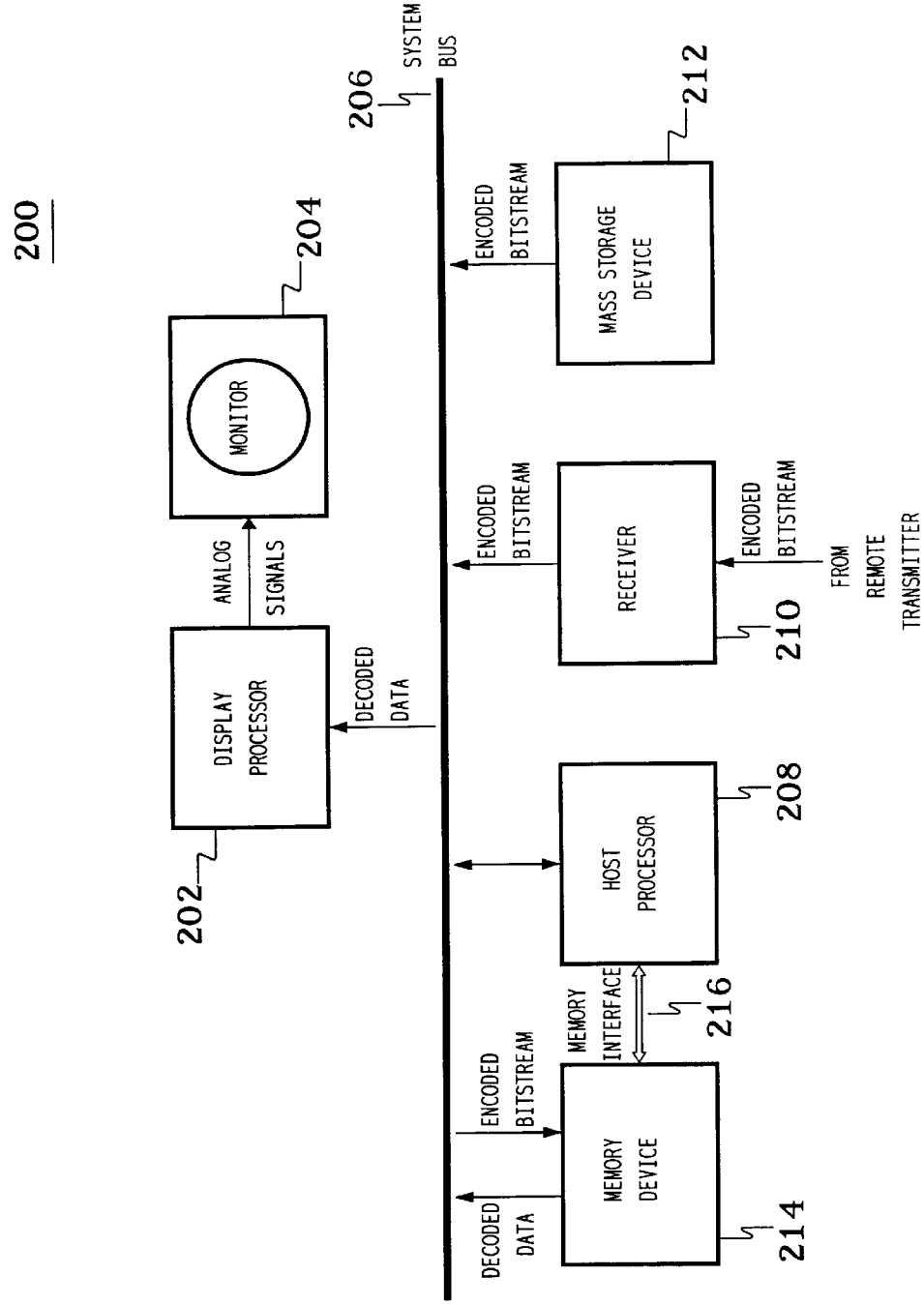
FIG. 2 is a block diagram of a computer system for decoding the video signals generated by the computer system of FIG. 1, according to one embodiment of the present invention.

Referring now to FIG. 2, there is shown a block diagram of computer system 200 for decoding the encoded video bitstream generated by encoding system 100 of FIG. 1, according to one embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data nay be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 may be a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In one embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 may be a general-purpose microprocessor manufactured by Intel Corporation, such as an i486™ microprocessor, Pentium® processor, or Pentium® Pro processor. System bus 114 may be any suitable digital signal transfer medium such as a peripheral component interconnect (PCI) bus. Memory device 112 may be any suitable computer memory device such as one or more dynamic random access memory (DRAM) devices. High-speed memory interface 110 may be any suitable means for interfacing between memory device 112 and host processor 116. Mass storage device 120 may be any suitable means for storing digital data such as a computer hard drive. Transmitter 118 may be any suitable means for transmitting digital data to a remote receiver such as a modem. Those skilled in the art will understand that the encoded video bitstream may be transmitted using any suitable means of transmission such as telephone line, RF antenna, local area network, or wide area network.

Referring again to FIG. 2, decoding system 200 may be a microprocessor-based PC system similar to the basic PC system of encoding system 100. In particular, host processor 208 may be any suitable means for decoding an encoded video bitstream such as a general-purpose microprocessor manufactured by Intel Corporation, such as an i486™ microprocessor, Pentium® processor, or Pentium® Pro processor. System bus 206 may be any suitable digital data transfer medium such as a PCI bus. Mass storage device 212 may be any suitable means for storing digital data such as a CD-ROM device or a hard drive. Receiver 210 may be any suitable means for receiving the digital data transmitted by transmitter 118 of encoding system 100 such as a modem. Display processor 202 and monitor 204 may be any suitable devices for processing and displaying video images (including the conversion of digital video data to analog video signals) and may be parts of a PC-based display system having a 24-bit PCI graphics board and an RGB monitor.

In one embodiment, encoding system 100 of FIG. 1 and decoding system 200 of FIG. 2 are two distinct computer systems. In an alternative embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Software Architecture for Video Encoding

Figure 3:
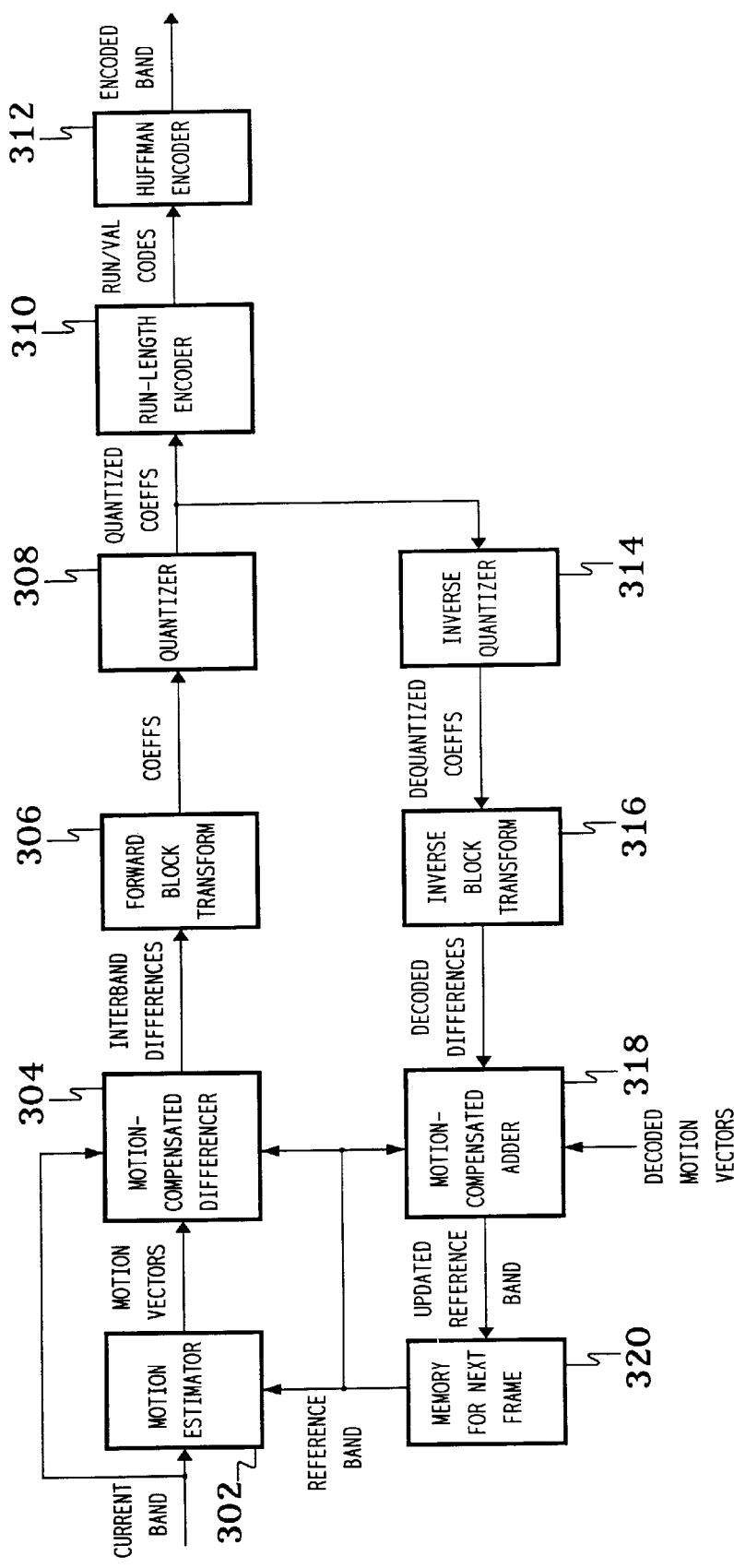
FIG. 3 is a block diagram of the software architecture for the video encoding processing implemented on the host processor of the encoding system of FIG. 1.

Referring now to FIG. 3, there is shown a block diagram of the software architecture for the video encoding processing implemented on host processor 116 of encoding system 100 of FIG. 1, according to one embodiment of the present invention. FIG. 3 shows inter-frame encoding for a band of frame data. Those skilled in the art will understand that, in a video codec that employs interframe encoding, some of the frames may be encoded using only intraframe encoding. It will be further understood that each block of an inter-encoded frame may be encoded as either an intra block (i.e, using intraframe encoding) or a difference block (i.e., using interframe encoding). The encoding of intra blocks is equivalent to the encoding of difference blocks shown in FIG. 3, except that the motion estimation of 302 and motion-compensated differencing of 304 are not performed.

For interframe encoding, motion estimator 302 of FIG. 3 performs motion estimation on blocks of the current band relative to a reference band to generate a set of motion vectors for the current band. Motion-compensated differencer 304 applies the appropriate motion vectors to the reference band to generate a motion-compensated prediction band. Differencer 304 also generates interband differences for the current band using the motion-compensated prediction band and the current band.

A forward block transform 306 (e.g., a DCT or slant transform) is applied to each block to generate coefficients for the current band. Quantizer 308 quantizes the coefficients to generate quantized coefficients for the current band. Run-length encoder 310 transforms the quantized coefficients into run-length encoded (RLE) data. In one embodiment, the RLE data for each block of quantized coefficients consist of a sequence of codes corresponding to run/val pairs, where each run/val pair is a non-zero quantized coefficient followed by a value corresponding to a run of zero coefficients (i.e., coefficients that are quantized to zero). In one embodiment, the run-length encoding follows an adaptively-generated pattern that tends to provide a long run of zero coefficients for the last run of the block. Huffman encoder 312 applies Huffman-type entropy (a.k.a. statistical or variable-length) coding to the RLE data to generate the encoded block data for the current band.

The encode processing of FIG. 3 also includes the decoding of the encoded band to update the reference band used in encoding the corresponding band of another video frame. Since the run-length and Huffman encoding are lossless encoding steps, the decode loop of the encode processing may begin at inverse quantizer 314, which dequantizes the quantized coefficients to generate dequantized coefficients for the current band. Inverse block transform 316 applies the inverse of forward block transform 306 to the dequantized coefficients to generate decoded differences for the current band. Motion-compensated adder 318 applies decoded motion vectors (generated by decoding the encoded motion vectors for the current band) to the current reference band to generate motion-compensated prediction band data. Adder 318 also performs interband addition using the motion-compensated prediction band data and the decoded differences to generate an updated reference band. The updated reference band is stored in memory 320 for use as the reference band in encoding the corresponding band of another video frame.

Figure 4:
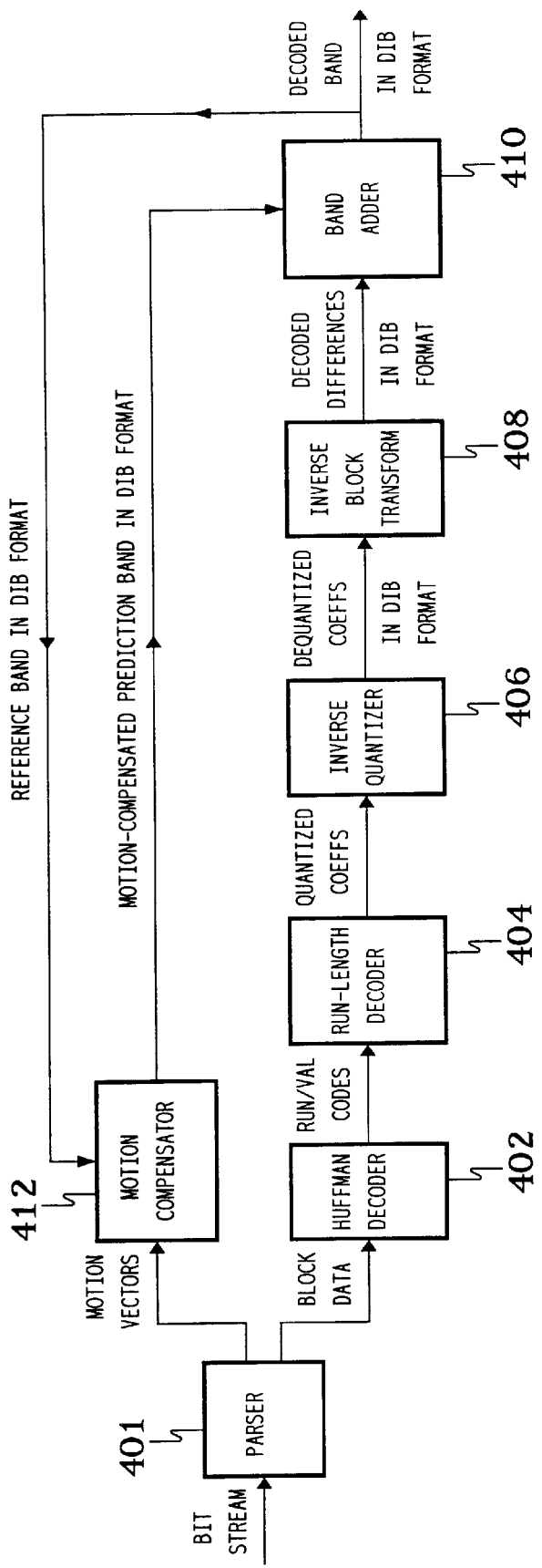
FIG. 4 is a block diagram of the software architecture for the video decoding processing implemented on the host processor of the decoding system of FIG. 2.

Software Architecture for Video Decoding:

Referring now to FIG. 4, there is shown a block diagram of the software architecture for the video decoding processing implemented on host processor 208 of decoding system 200 of FIG. 2, according to one embodiment of the present invention. The decode processing of FIG. 4 reverses the encode processing of FIG. 3. As such, FIG. 4 shows the decoding of inter-frame encoded data corresponding to a band of frame data. The decoding of intra-frame encoded data is equivalent to the decoding of inter-frame encoded data shown in FIG. 4, except that the motion compensation of motion compensator 412 and the band addition of band adder 410 are not performed.

In particular, parser 401 of FIG. 4 separates the block data (containing the encoded motion-compensated inter-frame differences) from other bitstream data (e.g., the encoded motion vectors). Huffman decoder 402 applies statistical decoding to the encoded block data for the current band to reconstruct the run-length encoded run/val data. Run-length decoder 404 transforms the RLE data into quantized coefficients. Inverse quantizer 406 dequantizes the quantized coefficients to generate dequantized coefficients. Inverse block transform 408 applies the inverse of forward block transform 306 of FIG. 3 to the dequantized coefficients to generate decoded inter-frame differences.

Meanwhile, motion compensator 412 applies the motion vectors for the current band to the reference band corresponding to a previously decoded frame to generate a motion-compensated prediction band. Band adder 410 adds the decoded inter-frame differences generated by inverse block transform 408 to the motion-compensated prediction band generated by motion compensator 412 to generate the decoded band for the current frame, which may also be used as a reference band for decoding a corresponding band of another frame.

Motion Compensation Using Conventional Block Order Format

In conventional decode processing, the blocks of each band of an encoded frame are decoded, for example, one at a time following a raster scan pattern (i.e., left to right across each row and top to bottom from row to row). The decoded band data are stored in memory in locations corresponding to the location of the pixels in the decoded image. This image data storage scheme is referred to in this specification as conventional block order format.

Referring now to FIG. 5, there is shown a representation of the decoded band data for two adjacent (8×8) blocks 502 and 504 stored in conventional block order. The locations of the band data in blocks 502 and 504 correspond to the pixel locations of the decoded image generated from that data. Left block 502 is adjacent to right block 504 in the frame and maintains that same orientation in memory. The decoded data may also be used as reference data for decoding encoded band data for another frame. In that case, motion compensator 412 of FIG. 4 applies motion vectors to the reference data of blocks 502 and 504 to generate motion-compensated prediction band data for the other frame.

Figure 6:
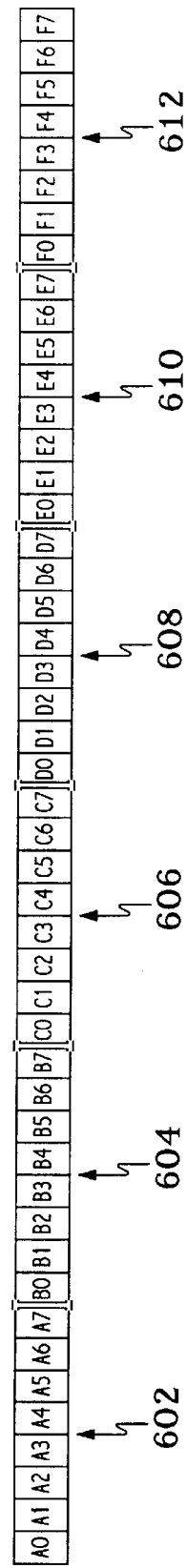
FIG. 6 is a representation of a single row of six consecutive (8×8) blocks of reference data stored in conventional block order.

Referring now to FIG. 6, there is shown a representation of a single row 600 of six consecutive (8×8) blocks 602–612 of reference data stored in conventional block order. During motion compensation, motion compensator 412 of FIG. 4 generates six blocks of motion-compensated prediction data by copying appropriate reference data. The X and Y coordinates of the motion vector for each block identify the appropriate reference data to copy for the corresponding block of the prediction data.

Referring now to FIGS. 7 and 8, there are shown tabulations of the motion-compensated prediction data for different X coordinates from −16 to +16 based on the reference data of FIG. 6. According to one convention, a positive motion vector X coordinate corresponds to inter-frame motion (i.e., from the reference frame to the motion-compensated prediction frame) from right to left, while a negative motion vector X coordinate corresponds to inter-frame motion from left to right. FIG. 7 shows the motion-compensated prediction data for block 502 of FIG. 5 and FIG. 8 shows the motion-compensated prediction data for block 504 of FIG. S. Although FIGS. 7 and 8 show motion vector X coordinates from −16 to +16, those skilled in the art will understand that these tables can be extended for motion vector X coordinates of any size. It will also be understood that the tables can also be modified to include half-pixel motion compensation.

FIGS. 7 and 8 indicate which reference data from FIG. 6 are copied to generate the motion-compensated prediction data. For example as shown in FIG. 7, when the X coordinate of the motion vector ($MV_x$) is −1, the B7 component of the reference data is copied into the C0 location when generating the prediction data. Similarly, for $MV_x$ of −1, the C0 component is copied into the C1 location, the C1 component is copied into the C2 location, and so forth, as shown in FIG. 7. It will be understood that the Y coordinate of the motion vector determines the row from which the reference data is copied. The tabulations of FIGS. 7 and 8 indicate only the columns for the reference data.

Referring now to FIG. 9, there is shown a tabulation of the data offsets for each of the X coordinates from −16 to +16 between the reference data of FIG. 6 and the motion-compensated prediction data of FIGS. 7 and 8. Each data offset identifies the displacement between a location in the prediction data and the corresponding location in the reference data. That is, the data offset identifies the relative position (in the X direction) of the reference data of FIG. 6 to be copied to generate the prediction data of FIGS. 7 and 8. According to one convention, for block order format, the data offsets are equal to the motion vector X coordinate, as shown in FIG. 9. This is consistent with the conventional block-order storage scheme as shown in FIGS. 5 and 6.

Under such a conventional block-order storage scheme, motion compensation is fairly straightforward. The X coordinate data offsets used in copying the reference data into the prediction locations for a particular block are all equal to the X coordinate of the motion vector for that block.

Motion Compensation Using Dual Interleaved Block Format

As described in the '994 application, inverse transform 408 of FIG. 4 can be implemented efficiently using pseudo-SIMD processing in which coefficient data for two blocks are transformed at one time. According to one embodiment, the coefficient data for one block are loaded into the high-order bits of registers and the coefficient data for a second block are loaded into the low-order bits of the same registers. Inverse transform processing is then applied to the registers as if they contained single values. In this way, two blocks can be efficiently transformed at one time. In order to make such pseudo-SIMD processing even more efficient, it is helpful to store the input and output data in memory in an interleaved fashion so that the data can be read into and out of the registers efficiently.

Figure 10:
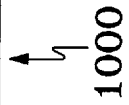
FIG. 10 is a representation of the two blocks of image data from FIG. 5 stored in memory in dual interleaved block (DIB) format, according to one embodiment of the present invention.

Referring now to FIG. 10, there is shown a representation of the two blocks 502 and 504 of image data from FIG. 5 stored in memory 1000 in dual interleaved block (DIB) format, according to one embodiment of the present invention. In DIB format, the components from blocks 502 and 504 are stored in memory in alternating fashion across each row.

Figure 11:
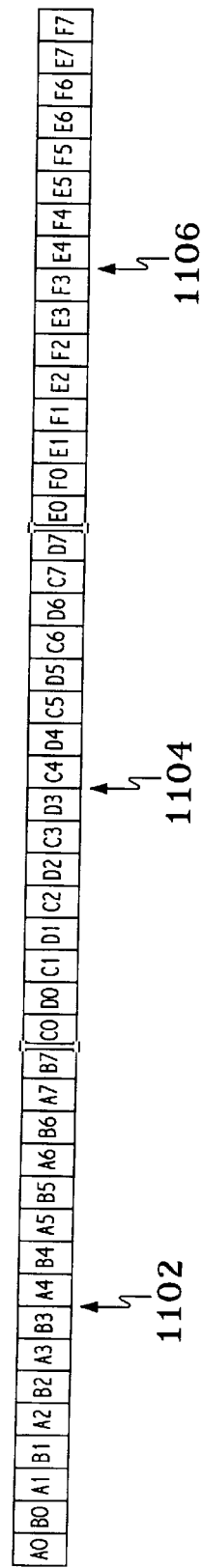
FIG. 11 is a representation of a single row of the six consecutive (8×8) blocks of reference data from FIG. 6 stored in DIB format.

Referring now to FIG. 11, there is shown a representation of a single row 1100 of the six consecutive (8×8) blocks 602–612 of reference data from FIG. 6 stored in DIB format. The data of blocks 606 and 608 of FIG. 6 are stored in DIB format in memory region 1104 of FIG. 11. Similarly, the data of blocks 602 and 604 and the data of blocks 610 and 612 of FIG. 6 are each stored in DIB format in memory regions 1102 and 1106 of FIG. 11, respectively.

Referring again to FIG. 4, the dequantized coefficient data generated by inverse quantizer 406 may be stored in memory in DIB format for use by inverse block transform 408. Inverse block transform 408 reads the dequantized coefficient data for two blocks at a time in DIB format from memory, applies the inverse block transform processing in pseudo-SIMD fashion to the two blocks at one time, and generates the decoded inter-frame differences in DIB format. If the motion-compensated prediction band data generated by motion compensator 412 is also in DIB format, then band adder 410 can be implemented efficiently in pseudo-SIMD fashion to add the difference data and the prediction data for two blocks at a time to generate decoded band data in DIB format.

Since the decoded band data is also in DIB format, it would increase processing efficiency further if motion compensator 412 could apply motion vectors to reference data (i.e., decoded band data) in DIB format to generate the motion-compensated prediction data in DIB format. In order to achieve the correct results, such DIB-based motion compensation should generate the same results as motion compensation using data stored in conventional block order format, as shown in FIGS. 7 and 8. As described below, if the reference data is stored in DIB format, the data offsets used during motion compensation will typically be different from those used when reference data is stored in conventional block order format. Moreover, the data offsets will typically be different (even for the same motion vector) depending upon whether the current block was originally the left block (e.g., block 502 of FIG. 5) or the right block (e.g., block 504 of FIG. 5) in the dual interleaved block format.

Another factor is that motion vectors for adjacent blocks, such as blocks 502 and 504 of FIG. 5, are allowed to be different. That is, the X coordinate of the motion vector used to generate the prediction data corresponding to block 502 may be different from the X coordinate of the motion vector used to generate the prediction data corresponding to adjacent block 504.

Referring now to FIG. 12, there is shown a tabulation of the data offsets for the reference data for left block 502 of FIG. 5, when the reference data is stored in the DIB format of FIG. 10. As shown in FIG. 7, when the X coordinate of the motion vector for block 502 is −1, the B7 component of the reference data is to be copied into the C0 location. As shown in FIG. 11, the data offset between the B7 component of the reference data and the C0 location is −1 (as tabulated in FIG. 12). Similarly, as shown in FIG. 7, for $MV_x$ of −1, the C0 component is to be copied to the C1 location. As shown in FIG. 11, the data offset between the C0 component and the C1 location is −2 (as tabulated in FIG. 12). As tabulated in FIG. 12, the −2 data offset is also applied to the other six components for $MV_x$ of −1.

Referring now to FIG. 13, there is shown a tabulation of the data offsets for the reference data for right block 504 of FIG. 5, when the reference data is stored in the DIB format of FIG. 10. As shown in FIG. 8, when the X coordinate of the motion vector for block 504 is −1, the C7 component of the reference data needs to be copied into the D0 location. As shown in FIG. 11, the data offset between the C7 component of the reference data and the D0 location is +13 (as tabulated in FIG. 13). Similarly, as shown in FIG. 8, for $MV_x$ of −1, the D0 component is to be copied to the D1 location. As shown in FIG. 11, the data offset between the D0 component and the D1 location is −2 (as tabulated in FIG. 13). As tabulated in FIG. 13, the −2 data offset is also applied to the other six components for $MV_x$ of −1.

Since the data interleaving of FIG. 10 is only in the X direction (i.e., within rows and not between rows), the Y coordinate of the motion vector continues to determine the row from which the reference data is copied (as was the case in the conventional motion compensation of FIGS. 5–9). According to one convention, each Y data offset is equal to the Y coordinate of the motion vector.

As shown in FIGS. 12 and 13, the data offsets for a given block are not necessarily constant for a given motion vector X coordinate. That is, for a given X coordinate, the 8 data offsets for the 8 different prediction locations of each row of a block are not necessarily all the same value (as was the case in the conventional motion compensation of FIG. 9). For example, as tabulated in FIG. 12, for $MV_x$ of −1, the 8 data offsets for block 502 of FIG. 5 are {−1, −2, −2, −2, −2, −2, −2, −2}, which are not all the same.

Moreover, the data offsets may differ depending upon whether the current block is the left block or the right block in the conventional block order format. That is, the set of 8 data offsets for a row of left block 502 of FIG. 5 is not necessarily the same as the set of 8 data offsets for a row of right block 504 for the same X coordinate. For example, as tabulated in FIG. 13, for $MV_x$ of −1, the set of 8 data offsets for block 504 is {+13, −2, −2, −2, −2, −2, −2, −2}, which is different from {−1, −2, −2, −2, −2, −2, −2, −2}, which is the set of data offsets for block 502 for the same $MV_x$ of −1, as tabulated in FIG. 12.

Figure 14:
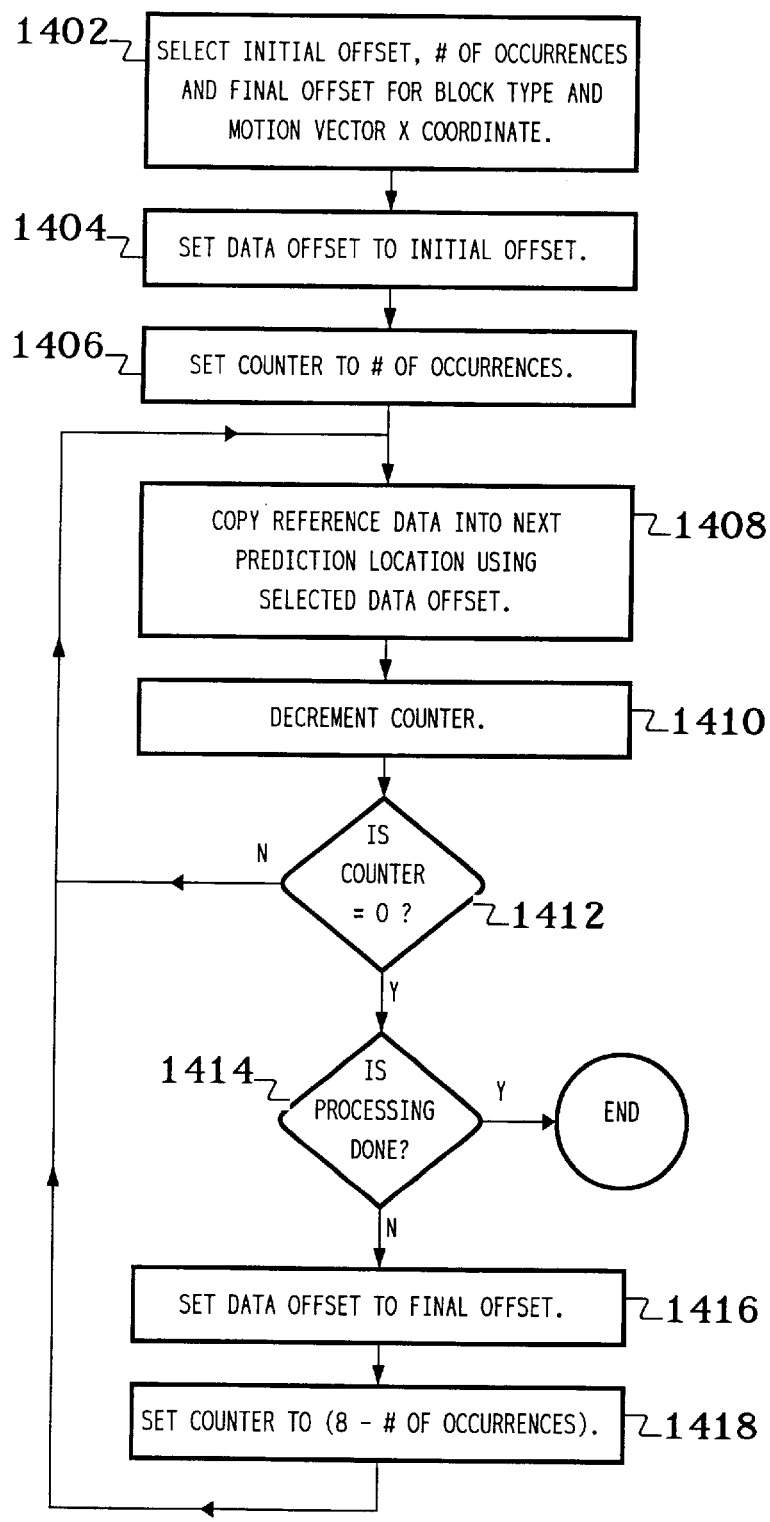
FIG. 14 is a flow diagram of the processing of the motion compensator of FIG. 4 to implement motion compensation using reference data in DIB format for each row of each block of prediction data, according to one embodiment of the present invention.

Referring now to FIG. 14, there is shown a flow diagram of the processing of motion compensator 412 of FIG. 4 to implement motion compensation using reference data in DIB format for each row of each block of prediction data, according to one embodiment of the present invention. As shown in FIGS. 12 and 13, for a given motion vector X coordinate and a given block type (i.e., left or right), each set of 8 data offsets can be defined by the following parameters: an initial data offset, the number of consecutive times the initial offset is to be used, and (if necessary) a final data offset. The final data offset is only needed if the initial offset is used fewer than 8 times. Moreover, the final data offset is repeated for the remainder of the set (i.e., 8 minus the number of initial-offset occurrences). The processing of FIG. 14 exploits these characteristics of the data offsets of FIGS. 12 and 13 to implement DIB-based motion compensation.

In particular, the initial offset value, the number of occurrences of that initial offset, and the final offset value are selected based on the current block type (i.e., left or right) and the current motion vector X coordinate (i.e., from −16 to +16) (step 1402 of FIG. 14). A data offset parameter is then set equal to the initial offset value (step 1404) and a counter is set equal to the number of initial-offset occurrences (step 1406). A reference data value (e.g., one of the components of FIG. 11) is then copied into the next prediction location using the selected data offset value to identify which reference data value to copy (step 1408). After the counter is decremented (step 1410), if the counter is not yet zero (step 1412), then processing returns to step 1408 to copy another reference data value to another prediction location. In this way, a number of reference data values equal to the number of initial-offset occurrences are copied to prediction locations using the initial data offset value.

After the counter has been decremented to zero (step 1412), it is determined whether processing has been completed for the current row of the current block (step 1414). Processing is completed if either (1) the number of initial-offset occurrences was 8 or (2) the final offset value has already been used. If the number of initial-offset occurrences was not 8 and the final offset value has not yet been used, then processing continues to steps 1416 and 1418. In step 1416, the data offset parameter is reset to the final offset value and, in step 1418, the counter is reinitialized to 8 minus the number of initial-offset occurrences. Processing then returns to the iteration loop of steps 1408 to 1412 to copy reference data for the remainder of the predication locations of the current row. After the counter again reaches 0, step 1414 will determine that processing is complete for the current row (since the final offset value will have already been used by that time).

The processing of FIG. 14 is repeated for each row of each block of prediction data during the DIB-based motion compensation of motion compensator 412 of FIG. 4. By providing a scheme for implementing motion compensation in DIB format, the present invention enables the processing of inverse block transform 408 and band adder 410 of FIG. 4 to be implemented efficiently in pseudo-SIMD fashion without having to convert image data back and forth between the interleaved (i.e., DIB) format and conventional block order format.

Those skilled in the art will understand that the functionality of the processing of FIG. 14 may be implemented in different ways. Referring again to FIGS. 12 and 13, the data offsets for the different motion vectors for each of the left and right blocks follow a pattern that may be characterized as a function of the motion vector X coordinate.

Referring now to FIG. 15, there is shown a tabulation of 23 different sets of offsets that correspond to the patterns exhibited by the data offsets in FIGS. 12 and 13. In FIG. 15, the low block offsets correspond to the left block in DIB format (e.g., block 502 of FIG. 5 in the DIB format of FIG. 10) and the high block offsets correspond to the right block in DIB format (e.g., block 504 of FIG. 5 in the DIB format of FIG. 10). The source (SRC) offsets correspond to the reference frame and the destination (DST) offsets correspond to the current frame (i.e., the motion-compensated prediction frame that results from applying motion compensation to the reference frame).

Referring now to FIGS. 16A–E, there is shown pseudocode for performing motion compensation to generate each block of a current prediction frame, according to one embodiment of the present invention. Based on the patterns exhibited in the data offsets of FIGS. 12 and 13, motion compensation of (8×8) blocks for any size motion vector can be implemented using the same basic set of code.

FIG. 16A contains pseudocode that performs the initialization for each block (lines 9–35) and the main processing loop for each block (lines 37–54).

FIGS. 16B–C contains groups of pseudocode corresponding to the 23 different pairs of SRC and DST offsets of FIG. 15 for low (LO) blocks, while FIGS. 16D–E contains pseudocode corresponding to the 23 different pairs of SRC and DST offsets of FIG. 15 for high (HI) blocks. Each group of pseudocode contains 4 lines of code (e.g., see lines 1–4 of FIG. 6B). The first line of each group of pseudocode is a label for the memory location of the pseudocode. The second line copies one component from the source (i.e., the reference frame) to the destination (i.e., the current frame). The third line decrements an X counter, and the fourth line returns processing to the main processing loop of FIG. 16A if the X counter is non-positive. When the X counter is initialized to 8, eight consecutive groups of pseudocode are implemented corresponding to the eight components in each row of an (8×8) block.

MCENTRY_TABLE, which is defined on lines 1–5 of FIG. 16A, contains the memory locations for the labels (e.g., LABEL_LO_0) of the first 16 groups of pseudocode for the LO and HI blocks of FIGS. 16B–E.

Implementation of the pseudocode of FIGS. 16A–E will be illustrated in the context of two particular examples.

First Example

As a first example, assume that the motion vector X coordinate for a LO block is +5. Referring again to FIG. 16A, since the current block is a LO block, the HI_LO index is set to 0 (line 10). The initial source and destination pointers (SRC0 and DST0) are initialized to the memory locations corresponding to first entries in the reference block and the current block, respectively, in DIB format (lines 13 and 16). The source pointer SRC is set to the appropriate row in the reference frame by adjusting the initial pointer SRC0 based on the motion vector Y coordinate and the pitch (where PITCH corresponds to the amount of memory allocated for each row of a video frame) (line 19).

The SRC pointer is adjusted and the destination pointer DST is set based on the motion vector X coordinate (lines 22 and 25). These adjustments are based on the patterns shown in the data offsets of FIGS. 12 and 13. In tile present example, where X is +5 and ignoring (for purposes of illustration) the pitch offset due to the motion vector Y coordinate, line 22 is evaluated as follows:

$$\begin{aligned}
SRC &= SRC0 + (X \text{ AND } (\text{BINARY\_NOT}(16-1))) \\
&= SRC0 + (+5 \text{ AND } (\text{BINARY\_NOT}(+15))) \\
&= SRC0 + (00000101 \text{ AND } (\text{BINARY\_NOT}(00001111)) \\
&= SRC0 + (00000101 \text{ AND } 11110000) \\
&= SRC0 + (00000000) \\
&= SRC0
\end{aligned}$$

Thus, in this example, at line 22, the SRC pointer is set equal to the initial SRC0 pointer. Line 25 is then evaluated as follows:

$$\begin{aligned}
DST &= DST0 - 2*(X \text{ AND } (16-1)) \\
&= DST0 - 2*(+5 \text{ AND } +15) \\
&= DST0 - 2*(00000101 \text{ AND } 00001111) \\
&= DST0 - 2*(00000101) \\
&= DST0 - 2*(+5) \\
&= DST0 - 10
\end{aligned}$$

Thus, in this example, at line 25, the DST pointer is set equal to the initial DST0 pointer minus 10. In this example and the next example, 8 bits of precision is shown in the processing. In other embodiments, different degrees of precision (e.g., 32 bits) may be used.

The jump location MCENTRY is then retrieved (line 28) based on a table look-up as follows:

$$\begin{aligned}
MCENTRY &= \text{MCENTRY\_TABLE}[HI\_LO][X \text{ AND } (16-1)] \\
&= \text{MCENTRY\_TABLE}[0][+5 \text{ AND } +15] \\
&= \text{MCENTRY\_TABLE}[0][5] \\
&= \text{LABEL\_LO\_5}
\end{aligned}$$

where HI_LO is as defined at line 10 and LABEL_LO_5 is the [0][5] entry of MCENTRY_TABLE as defined at lines 1–5. The SRC and DST pointers are pre-decremented by the PITCH (lines 31–32) in anticipation of the processing in the main loop (lines 37–54) and the Y counter is initialized to the block size (e.g., 8 for an (8×8) block) (line 35).

After the initialization of lines 9–35 has been completed, tile main loop of lines 37–54 controls the implementation of motion compensation for each row of the current block. Line 39 decrements YCOUNT and line 42 checks whether YCOUNT is negative, which would indicate that motion compensation for the current block has been completed, in which case processing jumps to MOTION1DONE at line 54 to return to line 7 to repeat the motion compensation processing for the next block in the frame.

When YCOUNT is initialized to 8, the processing of lines 44–52 will be implemented 8 times, once for each row of an (8×8) block. For each row, the X counter (XCOUNT) is initialized to the block size (e.g., 8) (line 45), the SRC and DST pointers are incremented by the PITCH (lines 48–49), and processing jumps to the memory location specified by MCENTRY (line 52) which was set at line 28. In the present example, MCENTRY was set to LABEL_LO_5, which means that processing jumps to line 26 of FIG. 16B.

Referring again to FIG. 16B, jumping to LABEL_LO_5 at line 26 results in the following processing. At line 27, one component from the source is copied to the destination. Substituting the equations at lines 22 and 25 of FIG. 16A into line 27 of FIG. 16B (and again ignoring the pitch offset) yields:

MEMORY[DST0−10+10]=MEMORY[SRC0+10]

or

MEMORY[DST0]=MEMORY[SRC0+10]

This represents the copying of the component at location (SRC0+10) into the location (DST0). As shown in FIG. 11, for DIB block 1104 in which SRC0 corresponds to the component C0, the component at location (SRC0+10) is C5, which is copied into location (DST0), which corresponds to the C0 location in the current block. This corresponds to the +10 data offset shown in FIG. 12 for the C0 location in the current block and $MV_x$ of +5.

At line 28, the XCOUNT is decremented from +8 to +7, which means that the test of line 29 will fail causing processing to continue to line 31. Similarly, XCOUNT will be decremented at lines 33, 38, 43, 48, 53, and 58 of FIG. 16B and at line 3 of FIG. 16C. After decrementing at line 3 of FIG. 16C, XCOUNT will be 0, which will result in a return at line 4 to the main processing loop MOTION1LOOP at line 53 of FIG. 16A. Until then, however, seven more components will be copied from the source to the destination as implemented at lines 32, 37, 42, 47, 52, and 57 of FIG. 16B and at line 2 of FIG. 16C. Substituting as before the equations at lines 22 and 25 of FIG. 16A into these copy operations (and again ignoring the pitch offset) yields:

FIG. 16B, Line 32: MEMORY[DST0+12−10]=MEMORY[SRC0+12]

FIG. 16B, Line 37: MEMORY[DST0+14−10]=MEMORY[SRC0+14]

FIG. 16B, Line 42: MEMORY[DST0+16−10]=MEMORY[SRC0+1]

FIG. 16B, Line 47: MEMORY[DST0+18−10]=MEMORY[SRC0+3]

FIG. 16B, Line 52: MEMORY[DST0+20−10]=MEMORY[SRC0+5]

FIG. 16B, Line 57: MEMORY[DST0+22−10]=MEMORY[SRC0+7]

FIG. 16C, Line 2: MEMORY[DST0+24−10]=MEMORY[SRC0+9]

Referring again to FIG. 11,

MEMORY[SRC0+12] corresponds to component C6

MEMORY[SRC0+14] corresponds to component C7

MEMORY[SRC0+1] corresponds to component D0
MEMORY[SRC0+3] corresponds to component D1
MEMORY[SRC0+5] corresponds to component D2
MEMORY[SRC0+7] corresponds to component D3
MEMORY[SRC0+9] corresponds to component D4 and

MEMORY[DST0+2] corresponds to the location of component C1
MEMORY[DST0+4] corresponds to the location of component C2
MEMORY[DST0+6] corresponds to the location of component C3
MEMORY[DST0+8] corresponds to the location of component C4
MEMORY[DST0+10] corresponds to the location of component C5
MEMORY[DST0+12] corresponds to the location of component C6
MEMORY[DST0+14] corresponds to the location of component C7

Thus, component C6 gets copied into the C1 location, C7 into the C2 location, D0 into the C3 location, D1 into the C4 location, D2 into the C5 location, D3 into the C6 location, and D4 into the C7 location. This conforms to the proper motion compensation for a motion vector X component of +5 as tabulated in FIG. 7.

Second Example

As a second example, assume that the motion vector X coordinate for a HI block is −12. Much of the processing for this example is the same as for the previous sample. Only the differences are highlighted in the following discussion.

Referring again to FIG. 16A, since the current block is a HI block, the HI_LO index is set to 1 (line 10). At line 22, the adjustment is applied to the SRC pointer as follows:

$$\begin{aligned} SRC &= SRC + (X \text{ AND } (\text{BINARY\_NOT}(16-1))) \\ &= SRC + (-12 \text{ AND } (\text{BINARY\_NOT}(+15))) \\ &= SRC + (11110100 \text{ AND } (\text{BINARY\_NOT}(00001111)) \\ &= SRC + (11110100 \text{ AND } 11110000) \\ &= SRC + (11110000) \\ &= SRC + (-16) \\ &= SRC - 16 \end{aligned}$$

Thus, in this example, line 22 subtracts 16 from the value of SRC. At line 25, the DST pointer is set as follows:

$$\begin{aligned} DST &= DST0 - 2*(X \text{ AND } (16-1)) \\ &= DST0 - 2*(-12 \text{ AND } +15) \\ &= DST0 - 2*(11110100 \text{ AND } 00001111) \\ &= DST0 - 2*(00000100) \\ &= DST0 - 2*(+4) \\ &= DST0 - 8 \end{aligned}$$

Thus, in this example, line 25 sets the DST pointer by subtracting 8 from the DST0 pointer.

The jump location MCENTRY is then retrieved (line 28) based on a table look-up as follows:

$$\begin{aligned} MCENTRY &= MCENTRY\_TABLE[HI\_LO][-12 \text{ AND } (16-1)] \\ &= MCENTRY\_TABLE[1][-12 \text{ AND } +15] \\ &= MCENTRY\_TABLE[1][4] \\ &= LABEL\_HI\_4 \end{aligned}$$

where HI_LO is as defined at line 10 and LABEL_HI_4 is the [1][4] entry of MCENTRY_TABLE as defined at lines 1–5.

After the initialization of lines 9–35 has been completed, the main loop of lines 37–54 is implemented. In the present example, MCENTRY was set to LABEL_HI_4, which means that processing at line 52 jumps to line 21 of FIG. 16D.

Referring again to FIG. 16D, jumping to LABEL_HI_4 at line 21 results in eight copy operations. Substituting equations 22 and 25 into these eight copy operations (and again ignoring the pitch offset due to the motion vector Y coordinate) yields:

FIG. 16D, Line 22: MEMORY[DST0−8+9]=MEMORY[SRC0−16+9]
FIG. 16D, Line 27: MEMORY[DST0−8+11]=MEMORY[SRC0−16+11]
FIG. 16D, Line 32: MEMORY[DST0−8+13]=MEMORY[SRC0−16+13]
FIG. 16D, Line 37: MEMORY[DST0−8+15]=MEMORY[SRC0−16+15]
FIG. 16D, Line 42: MEMORY[DST0−8+17]=MEMORY[SRC0−16+16]
FIG. 16D, Line 47: MEMORY[DST0−8+19]=MEMORY[SRC0−16+18]
FIG. 16D, Line 52: MEMORY[DST0−8+21]=MEMORY[SRC0−16+20]
FIG. 16D, Line 57: MEMORY[DST0−8+23]=MEMORY[SRC0−16+22]

Referring again to FIG. 11,

MEMORY[SRC0−7] corresponds to component B4
MEMORY[SRC0−5] corresponds to component B5
MEMORY[SRC0−3] corresponds to component B6
MEMORY[SRC0−1] corresponds to component B7
MEMORY[SRC0] corresponds to component C0
MEMORY[SRC0+2] corresponds to component C1
MEMORY[SRC0+4] corresponds to component C2
MEMORY[SRC0+6] corresponds to component C3 and

MEMORY[DST0+1] corresponds to the location of component D0
MEMORY[DST0+3] corresponds to the location of component D1
MEMORY[DST0+5] corresponds to the location of component D2
MEMORY[DST0+7] corresponds to the location of component D3
MEMORY[DST0+9] corresponds to the location of component D4
MEMORY[DST0+11] corresponds to the location of component D5
MEMORY[DST0+13] corresponds to the location of component D6
MEMORY[DST0+15] corresponds to the location of component D7

Thus, component B4 gets copied into the D0 location, B5 into the D1 location, B6 into the D2 location, B7 into the D3 location, C0 into the D4 location, C1 into the D5 location, C2 into the D6 location, and C3 into the D7 location. This conforms to the proper motion compensation for a motion vector X component of −12 as tabulated in FIG. 8.

Alternative Embodiments

The present invention has been described in the context of motion compensation of (8×8) blocks of image data. Those skilled in the art will understand that the present invention may also be applied to motion compensation of regions of image data of shapes and sizes other than square (8×8) blocks. It will also be understood that the present invention may be used for bi-directional as well as uni-directional motion-compensated prediction schemes. The present invention may also be used for half-pixel and other partial pixel motion-compensation scheme in addition to integer pixel motion compensation.

In the DIB-based processing of FIGS. 10–14, the data for two horizontally adjacent blocks are interleaved in the X direction (i.e., within rows). The present invention may also be implemented where vertically adjacent blocks are interleaved in the Y direction (i.e., within columns). In addition, interleaving may be implemented for more than two blocks. In general, the present invention applies to motion compensation of interleaved data resulting from the interleaving of two or more blocks in either the X direction, the Y direction, or even a combination of both. In general, the interleaved blocks need not even be located adjacent to one another when stored in the conventional block order format.

The DIB-based processing of the present invention has been described in the context of the decode processing of FIG. 4. Those skilled in the art will understand that the present invention may also be applied during the decode loop of the encode processing of FIG. 3. Moreover, in addition to video compression processing, the DIB-based motion compensation processing of the present invention may be implemented in other image processing applications that use motion compensation.

The present invention has been described in the context of a system that implements some of its steps in pseudo-SIMD fashion. It will also be understood that the present invention may be applied to image processing applications implemented using true SIMD processing.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose microprocessor, the program code segments combine with the microprocessor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing image data, comprising the steps of:
   (a) providing input reference frame image data stored in an interleaved format;
   (b) applying a first motion vector to the input reference frame image data in the interleaved format to generate a first block of motion-compensated prediction frame image data; and
   (c) applying a second motion vector to the input reference frame image data in the interleaved format to generate a second block of motion-compensated prediction frame image data, wherein the first and second blocks are interleaved together in the interleaved format.

2. The method of claim 1, wherein the first motion vector is different from the second motion vector.

3. The method of claim 1,
   further comprising the step of adding inter-frame difference data in the interleaved format to the motion-compensated prediction frame image data in the interleaved format to generate decoded frame data in the interleaved format.

4. The method of claim 3, wherein the inter-frame difference data in the interleaved format are generated by applying an inverse transform in pseudo-SIMD fashion to transform coefficient data in the interleaved format.

5. The method of claim 1, wherein step (b) comprises the steps of:
   (1) determining an initial offset value for the first block based on a coordinate of the first motion vector; and
   (2) using the initial offset value to generate an initial number of components of the motion-compensated prediction frame image data for the first block.

6. The method of claim 5, wherein step (b) further comprises the steps of:
   (3) determining a final offset value for the first block based on the coordinate of the first motion vector; and
   (4) using the final offset value to generated a final number of components of the motion-compensated prediction frame image data for the first block.

7. The method of claim 6, wherein:
   the input reference frame image data are interleaved horizontally; and
   the initial and final offset values for the first block are generated based on an X coordinate of the first motion vector.

8. The method of claim 7,
   further comprising the step of adding inter-frame difference data in the interleaved format to the motion-compensated prediction frame image data in the interleaved format to generate decoded frame data in the interleaved format, wherein the inter-frame difference data in the interleaved format are generated by applying an inverse transform in pseudo-SIMD fashion to transform coefficient data in the interleaved format.

9. The method of claim 1, wherein step (b) comprises the steps of:
   (1) generating source and destination pointers corresponding to the first motion vector; and
   (2) using the source and destination pointers to copy the input reference frame image data in the interleaved format into the first block of motion-compensated prediction frame image data in the interleaved format.

10. An apparatus for processing image data, comprising:
    (a) means for providing input reference frame image data stored in an interleaved format;

(b) means for applying a first motion vector to the input reference frame image data in the interleaved format to generate a first block of motion-compensated prediction frame image data; and (c) means for applying a second motion vector to the input reference frame image data in the interleaved format to generate a second block of motion-compensated prediction frame image data, wherein the first and second blocks are interleaved together in the interleaved format.

11. A storage medium having stored thereon a plurality of instructions for processing image data, wherein the plurality of instructions, when executed by a processor, cause the processor to perform the steps of:

(a) means for causing a machine to provide input reference frame image data stored in an interleaved format;

(b) means for causing the machine to apply a first motion vector to the input reference frame image data in the interleaved format to generate a first block of motion-compensated prediction frame image data; and (c) means for causing the machine to apply a second motion vector to the input reference frame image data in the interleaved format to generate a second block of motion-compensated prediction frame image data, wherein the first and second blocks are interleaved together in the interleaved format.

12. An apparatus for processing image data, comprising:

an input-image generator; and a motion compensator, wherein:

the input-image generator provides input reference frame image data stored in an interleaved format;

the motion compensator applies a first motion vector to the input reference frame image data in the interleaved format to generate a first block of motion-compensated prediction frame image data; and the motion compensator applies a second motion vector to the input reference frame image data in the interleaved format to generate a second block of motion-compensated prediction frame image data, wherein the first and second blocks are interleaved together in the interleaved format.

* * * * *